Patented June 19, 1923.

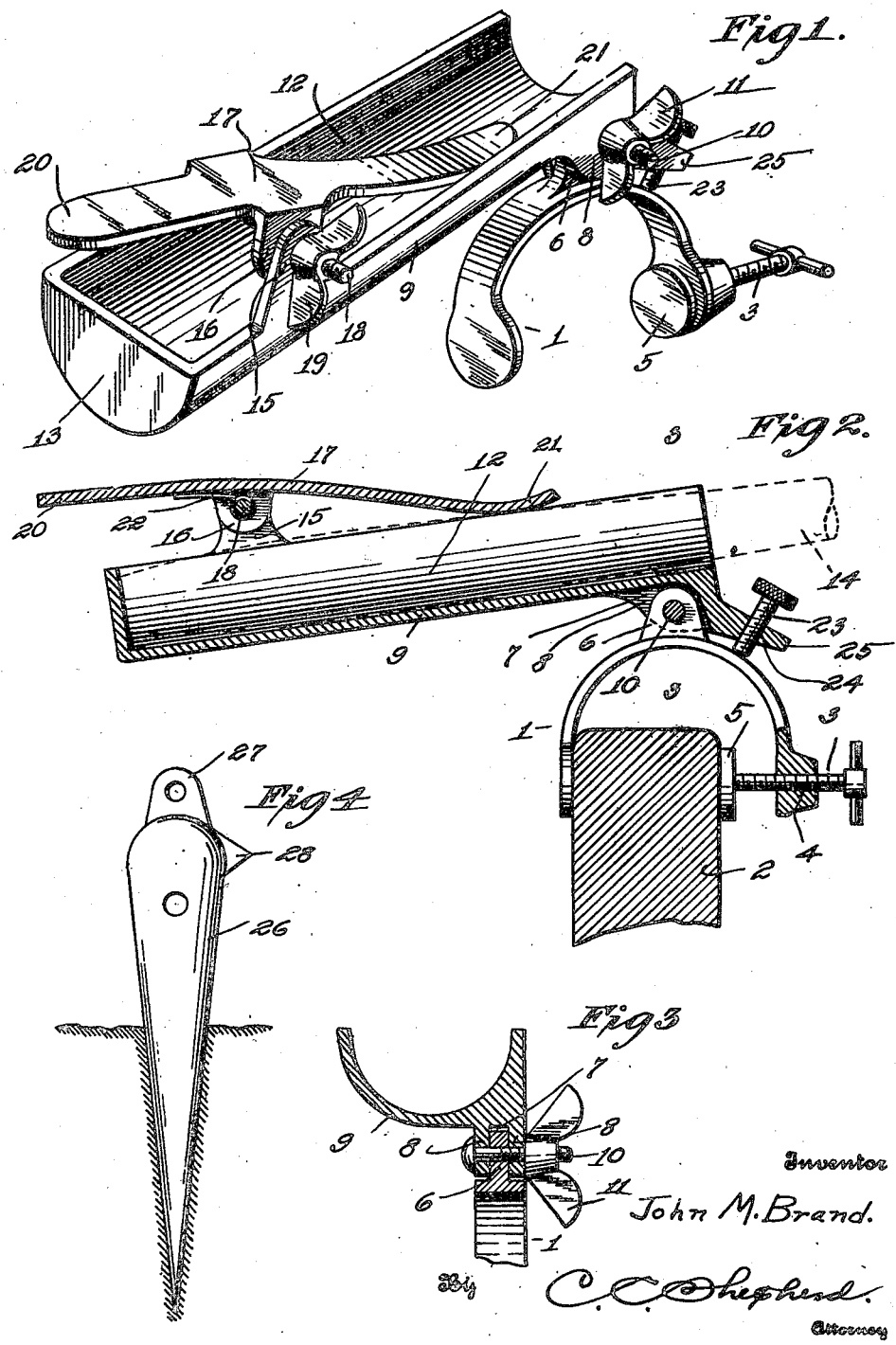

1,459,438

UNITED STATES PATENT OFFICE.

JOHN MATHIAS BRAND, OF COLUMBUS, OHIO.

POLE SUPPORT.

Application filed October 12, 1921. Serial No. 507,299.

*To all whom it may concern:*

Be it known that JOHN M. BRAND, a citizen of the United States, residing at Columbus, in the county of Franklin and State of Ohio, has invented certain new and useful Improvements in Pole Supports, of which the following is a specification.

This invention relates to improvements in pole supports, and has particular reference to an improved supporting structure adapted for use in connection with fishing poles for the purpose of retaining the latter in any desired position of operation and to dispense with the necessity of the manual holding of such poles or rods.

An object of the invention resides in the provision of a support of this character which is so formed as to be capable of being readily and detachably secured to the side of a boat or other relatively stationary body, and wherein an improved socket member is provided by means of which the handle of a fishing rod is capable of being securely yet detachably gripped in secured relation with the support and maintained in various operative positions.

A further object of the invention resides in the provision of a support for fishing rods which consists in the provision of a base mounting capable of being securely associated with a relatively stationary base of any appropriate character, and in pivotally connecting the socket member with said base mounting so that a rod, positioned within the socket member may be adjusted to assume various angular operative positions, there being an adjustable stop device between the base mounting and the socket member to positively limit, without resorting to the use of a frictional connection, the extent of oscillation of the socket member and to enable thereby the adjusted positions of the socket member and an associated rod to be maintained irrespective of the weight of the rod. A further object rests in providing the socket member with a spring pressed resilient tongue capable of frictionally gripping the end of a fishing rod positioned within the socket member and to permit of facility in positioning the rod within the socket member or its removal therefrom.

With these and other objects in view as will appear as the description proceeds, the invention consists in the novel features of construction, combinations of elements and arrangements of parts, hereinafter to be fully described, and distinctly pointed out in the appended claim.

In the accompanying drawing, forming a part of this specification, and in which similar characters of reference denote like and corresponding parts throughout the several views thereof:

Figure 1 is a perspective view of the improved fishing pole support comprising the present invention, Figure 2 is a vertical longitudinal sectional view taken through the support, Figure 3 is a vertical transverse sectional view taken through the support on the line 3—3 of Figure 2, and Figure 4 is a side elevation of a slightly modified form of base mounting for the support.

Referring more particularly to the details of the invention, there is provided a pole support which is primarily adapted for use in connection with boats or the like for the purpose of retaining a fishing rod in various operative positions without requiring manual attention. The support consists, in the specific embodiment illustrated in Figures 1 to 3, of a base mounting, which is formed to include a substantially yoke shaped body of inverted U shaped formation, which is capable of being positioned over the upper edge or side 2 of a boat, or the like and to be securely yet detachably retained in such an applied position by the provision of a manually operated screw 3, which is threaded within a bore 4 provided in one of the legs of the mounting 1, the inner end of the screw being provided with an enlarged head 5 which, upon the manipulation of the screw, is capable of being brought into firm frictional engagement with the side 2 of a boat or other relatively stationary object for the purpose of rigidly retaining the base mounting 1 in a fixed operative position and to retain the same against undue movement when in use.

The upper part of the base mounting is formed in this instance with an integral ear 6 suitably apertured and adapted to be received within a recess 7 formed between a pair of downwardly projecting integral lugs 8 provided upon the under part of an adjustable rod holder or socket member 9. The lugs 8 are also apertured to register with the aperture provided in the ear 6, and a headed bolt 10 is arranged to pass through these aligned apertures for the purpose of providing a horizontal pivotal connection between the mounting 1 and the rod holder 9. The outer end of the bolt 10 is threaded to receive a wing nut 11 which upon being tightened will serve to resiliently compress the lugs 8 so that the latter may be forced into frictional engagement with the ear 6 and to assist thereby in the retaining of the rod holder in various relative positions with respect to the mounting 1.

The rod holder consists of a transversely semi-circular body of suitable length having a longitudinally extending rod socket 12 formed therein, one end of said socket being closed by means of a wall 13 against which the lower or inner end of a fishing rod or pole 14 is adapted to engage, the other end of said socket being open to admit of the proper positioning of the lower or inner end of the rod 14 within the socket. To retain the rod in the socket there is provided a pair of upwardly projecting ears 15 upon the upper edges of the holder 9, which are arranged for cooperation with a similar pair of ears 16 formed upon a holding tongue 17, the said ears 15 and 16 being apertured to receive a bolt 18 arranged to extend therethrough, as shown more particularly in Figures 1 and 2, one end of the bolt 18 being arranged to project beyond the corresponding ear 15 to threadedly receive a wing nut 19 capable upon being tightened or loosened to control the freedom of pivotal movement of the tongue. The said tongue, as shown, includes an outwardly projecting manipulating end 20, which is arranged above and is appreciably spaced from the end wall 13 of the socket 12, so that by being engaged by the thumb of the operator the said tongue may be oscillated bodily about its pivotal bolt 18 so that the depressed forwardly situated rod engaging extremity 21 of the tongue may be raised or lowered out of or into engagement with the rod 14 situated within the socket of the holder. In the present form of the invention the said bolt 18 is provided with a coiled wire spring 22, which has one of its ends fixed to the bolt 18 and the other extremity disposed to engage with the lower surface of the manipulating end 20 of the tongue, the said spring serving to rock the extremity 21 into frictional holding engagement with the rod positioned within the socket 12. It will be apparent that by this construction the mere oscillation of the tongue 17 will be all that is required to effect the removal or positioning of a rod or other analogous device in or out of engagement with the holder.

An important phase of the present invention resides in the provision of a construction for positively retaining the rod holder in various fixed positions of adjustment with respect to the base mounting. It has been found by use that owing to the weight of a rod mere frictional pressure will not be sufficient to prevent the holder from turning about its pivotal mounting, and for this reason the bolt and nut construction 10 and 11 is supplemented by means of a screw 23, which is threaded within a bore 24 provided in an ear 25 integrally formed with and angularly projecting from the forward extremity of the holder 9. By this construction it will be manifest that the screw 23 may be brought to bear against the upper part of the base mounting 1 so as to positively engage said mounting. Therefore, through the use of the screw 23 and the specific position occupied thereby it will be seen that undue oscillation of the rod holder, which is normally effected by the weight of the outwardly projecting end of the pole, will be positively precluded by the engagement provided between the screw 22 and the base mounting. Of course it will be obvious that the ear 25 may directly engage with the base mounting so as to limit oscillation of the holder but by the provision of the screw 23 any desired adjustment of the holder may be preserved. In Figure 4 a slightly modified form of base mounting has been shown. This mounting is in the form of a stake and is designated by the numeral 26, the same being capable of being forced or driven into the ground and to thus provide a support for the holder 9 when the user is fishing from the shore. The upper end of the stake is formed with an ear 27, corresponding to the ear 6 in that it provides a horizontal pivotal mounting for the rod holder. The stake is also formed with an offset lug 28, which serves as a fixed abutment for the lower end of the adjusting screw 23 of the holder. It will thus be understood that either of the base mountings may be used in connection with a common form of rod holder.

What is claimed is:

A fishing pole support comprising a rod holder formed to include a longitudinally extending socket, a pair of upstanding ears provided upon the holder, a bolt supported by the ears and disposed transversely of the socket, a tongue pivotally connected to the said bolt, spring means engaged with the tongue to hold the same in yielding engagement with a rod positioned within the socket of said holder, said bolt also serving to limit the tilting movement of the rod in one direction.

In testimony whereof I affix my signature.

JOHN MATHIAS BRAND.